United States Patent [19]

Agostini et al.

[11] Patent Number: 4,890,474

[45] Date of Patent: Jan. 2, 1990

[54] MOTOR-DRIVEN PORTABLE TONGS FOR CLAMPING CRAMPS OR THE LIKE

[76] Inventors: Raffaele Agostini, Via del Greto 2/3, Bologna; Lorenzo Prioli, Via Scacciani 2, Pesaro, both of Italy

[21] Appl. No.: 233,556

Related U.S. Application Data

[63] Continuation of PCT EP87/00797, filed Dec. 18, 1987, published as WO88/04597 on Jun. 30, 1988.

[22] Filed: Aug. 18, 1988

[30] Foreign Application Priority Data

Dec. 18, 1986 [IT] Italy .................... 3615-A/86

[51] Int. Cl.[4] .................... B21F 45/16; B23P 11/00

[52] U.S. Cl. .................... 72/416; 72/407; 72/453.16; 29/243.56

[58] Field of Search .................... 72/416, 407, 410, 453.16, 72/454, 424; 29/243.56

[56] References Cited

U.S. PATENT DOCUMENTS

| | | | |
|---|---|---|---|
| 2,174,152 | 9/1939 | Curtiss | 72/410 |
| 2,256,382 | 9/1941 | Dole | 72/410 |
| 3,015,824 | 1/1962 | Richardson | 72/410 |
| 3,066,304 | 12/1962 | Wantland | 72/424 |
| 3,068,485 | 12/1962 | Lingle | 72/424 |
| 3,287,955 | 11/1966 | Winglow et al. | 72/407 |
| 3,628,230 | 12/1971 | Grise | 72/410 |
| 3,830,089 | 8/1974 | Boyd et al. | 72/407 |

FOREIGN PATENT DOCUMENTS

| | | |
|---|---|---|
| 1181116 | 11/1964 | Fed. Rep. of Germany . |
| 1552048 | 11/1968 | France . |
| 2231480 | 12/1974 | France . |

*Primary Examiner*—Daniel C. Crane
*Attorney, Agent, or Firm*—Cohen, Pontani & Lieberman

[57] ABSTRACT

The seats, into which the "C" clips are inserted before being clamped, are located in parts of the free end-sections of the jaws situated above the support-plate extending beyond the other surface of the plate. Located under the latter is the thrust-plate for transferring the clips from the magazine to the seats. As a result of this arrangement, the thrust-plate may be located in the position of maximal advance towards the seats and its front edge acts as a stop to prevent withdrawal of the back of the clip when the latter is clamped between the parts of the free end-sections of the jaws. Movement of the jaws and displacement of the thrust-plate may be caused by alternate movement of rods from double-acting hydraulic-jack rods, or racks which engage pinions mounted rotatably but axially immovably upon the shaft and are released therefrom by means of a clutch controlled by an electromagnetic element.

13 Claims, 8 Drawing Sheets

MOTOR-DRIVEN PORTABLE TONGS FOR CLAMPING CRAMPS OR THE LIKE

RELATED APPLICATIONS

This application is a Continuation of International Application filed under the Patent Cooperation Treaty bearing application Ser. No. PCT/EP87/00797 filed Dec. 18, 1987 and published as WO88/04597 on June 30, 1988, which application lists the United States as designated country and, in turn, is based on Italian application Ser. No. 3615A/86 filed Dec. 18, 1986.

FIELD OF THE INVENTION

The present invention relates to a portable motorized grip for the irreversible clamping of "C" clips or the like, more particularly to a grip for use in connecting elongated elements, especially the edges of sheets of metal netting forming the walls of structures used to provide protection against landslides and erosion.

BACKGROUND OF THE INVENTION

Portable motorized grips are already known for use for the above-mentioned purposes, the grips comprising a pair of jaws identical in mirror-image, pivoted, at intermediate points along their length, to a supporting structure and arranged symmetrically in relation to a plane running parallel with the longitudinal direction of the grip; located in the free end-sections, projecting outwardly and normally spread apart, of the jaws are seats adapted to receive and hold the curved opposing parts of "C" clips, each of which is transferred to its seat, while turning its open side towards the end-sections, by the action applied to the relevant back by a thrust-plate parallel with the jaws and controlled, by means of a rod integral therewith, in such a manner as to carry out alternate longitudinal movements; and the grip comprising a stop adapted to prevent withdrawal of the back of the clip inserted into the seat when the free end-sections of the jaws are brought together in order to clamp the clip.

In this known grip, the thrust-plate lies in the plane containing the jaws and the rod integral therewith constitutes the piston-rod of a double acting pneumatic jack. Insertion of the clip in the seats located in the free end-sections of the jaws is complete when the thrust-plate is in the terminal position towards the said seats; clamping of the clip is completed while the plate approaches its terminal position in the opposite direction. Finally, the stop which prevents withdrawal of the back of the clip which has been clamped is snap-acting and consists of a pawl adapted to locate itself, under the action of a spring, behind the central part of the back of the clip inserted into their seats.

The design of the known grip, described hereinbefore, has certain serious disadvantages which greatly affect its reliability and drastically limit the fields of application.

One of these disadvantages is that the snap-acting stop, consisting of a spring-loaded pawl, is totally incapable of withstanding thrusts, often of the order of some hundreds of kg, acting thereupon while the clips are being clamped. A stop of this kind is easily rendered unserviceable by breakage of the spring or seizure of the pawl, and if the grip is used, as naturally intended, for upholstering or the like, i.e. for clamping substantially less rigid clips, the clips may be deformed irregularly or are lost because they are expelled prematurely from their seats in the jaws.

Another no less serious disadvantage is that the jack which actuates known grips is of the pneumatic type. Since in areas where the grips in question are used, compressed air is not generally available in excess of 6 to 7 atm., it is obvious that a thrust of the magnitude mentioned hereinbefore can be obtained only at the cost of using jacks of a bulk and weight incompatible with the requirements of a portable unit.

SUMMARY OF THE INVENTION

The present invention is directed to the provision of a portable grip of the type specified hereinbefore which lacks the aforesaid disadvantages, is capable of assuring efficient and secure clamping of clips of adequate strength, while its bulk and weight are compatible with prolonged and continuous use, during a working day, by an operator of average strength, in the environmental conditions of a work-site dedicated to the assembly and erection of cases of metal netting.

As may be gathered from the foregoing, the technical problems facing the invention are to be perceived in finding a way of ensuring that the clip is not deformed undesirably while being clamped by the jaws and in adopting actuating mean which make it possible to apply to the clip, while it is being clamped, a very significant thrust while keeping the bulk and weight of the unit within limits acceptable for portable unit.

According to the present invention, this is accomplished by means of a portable, jack-operated grip for the irreversible clamping of "C" clips or the like comprising a pair of jaws identical in mirror-image, pivoted, at intermediate points along their length, to a supporting structure and arranged symmetrically in relation to a plane parallel with the longitudinal direction of the grip; located in the free end-sections, projecting outwardly and normally spread apart, of the jaws are seats adapted to receive and hold the curved opposing parts of "C" clips, each of which is transferred to its seat, while turning its open side towards the end-sections, under the action applied to the relevant back by a thrust-plate and controlled, by means of a rod integral therewith, in such a manner as to carry out alternate longitudinal movements; and the grip comprising a stop for preventing withdrawal of the back of the clip inserted into the seat when the free end-sections of the jaws are brought together to clamp the clip, wherein the jaws are spaced from the plane in which the thrust-plate moves; the seats for receiving the curved opposing parts of the "C" clips are located in the parts of the free end-sections of the jaws extending towards the plane in which the thrust-plate moves; and the stop, which prevents withdrawal of the back of the clip during the clamping thereof, comprises the front edge of the thrust-plate.

According to the one embodiment of the invention, alternate movement of the jaws is also produced by a rod controlled in which a manner as to carry out alternate longitudinal movements preferably in parallel with the rod integral with the thrust-plate According to another embodiment of the invention, either the rod causing alternate movement of the jaws, or the rod integral with the thrust-plate, constitute the piston-rod of a double-acting jack.

According to a preferred embodiment of the invention, the jacks are hydraulic jacks.

According to one variant of the invention, the alternate movements of each of the rods are produced by a reversible electric motor.

According to a preferred embodiment of the invention, the alternate movements of both rods are controlled by a reversible electric motor through a clutch and kinematics which are reversible.

BRIEF DESCRIPTION OF THE DRAWINGS

Other characteristics and advantages of the invention may be gathered from the following description in conjunction with a practical embodiment illustrated, by way of example, in the drawings attached hereto, wherein.

DETAILED DESCRIPTION OF THE INVENTION

Figure 1:
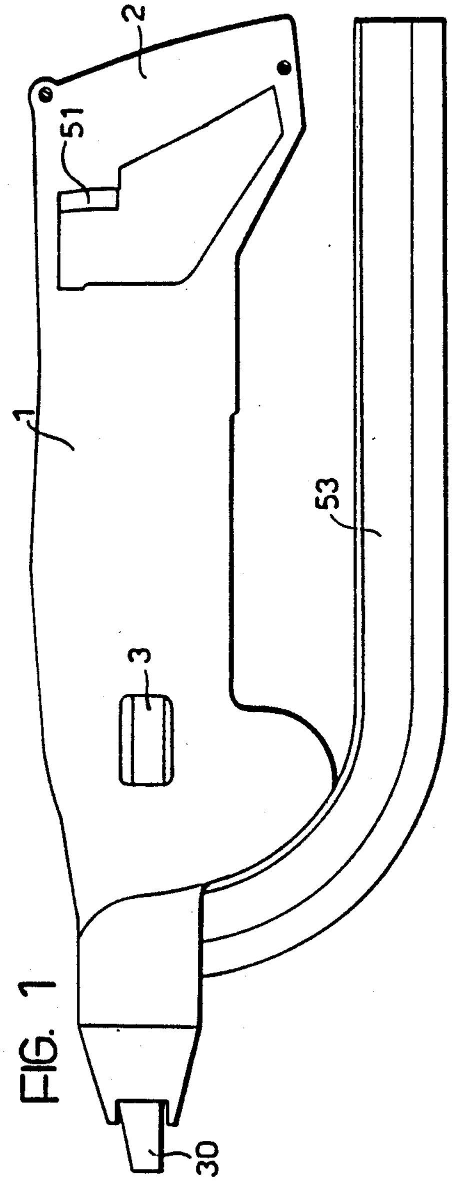
FIG. 1 is a diagrammatical side elevation of the grip according to the invention.
Figure 10:
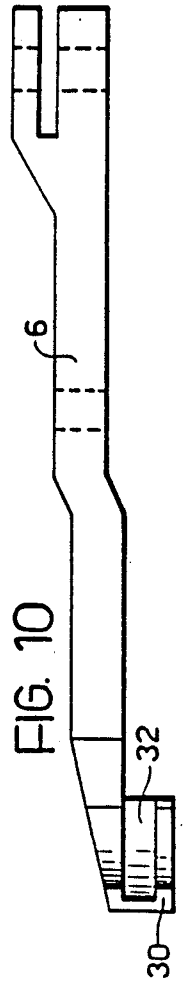
FIG. 10 is a side elevational view in the direction of arrow X in FIG. 9.
Figure 9:
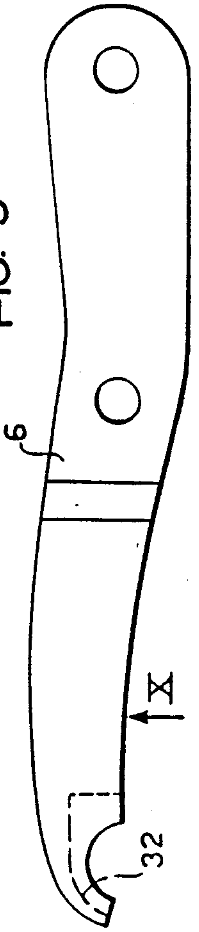
FIG. 9 is a plan view of one of the jaws of the grip according to the invention.
Figure 8:
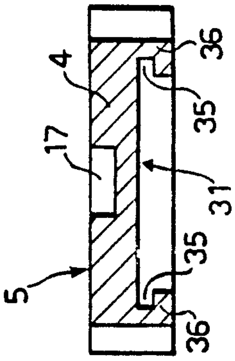
FIG. 8 is a cross-sectional view through the plate supporting the jaws, along the line VIII—VIII in FIG. 4.

In all figures, corresponding elements bear the same reference numerals.

The portable grip illustrated in FIGS. 1 to 11 of the drawings comprises an external fairing or housing 1 provided with a rear handle 2 and a lateral handle 3. This fairing 1 is secured to the load-bearing structure of the grip which includes a longitudinal supporting plate 4.

Fitted to surface 5 of the supporting plate 4 is a pair of jaws 6 and 7, identical in mirror-image and arranged symmetrically in relation to longitudinal median plane 8 of the apparatus (see FIGS. 3 and 7), perpendicular to plate 4.

Jaws 6 and 7 are mounted to rotate about fulcra 9,10 projecting from surface 5 of plate 4 and have free end-sections extending beyond front edge 11 of the supporting plate 4.

Mounted at the ends of jaws 6 and 7 opposite the free end-sections are rotatable connecting rods 12,13 which are hinged, by means of bolt 14 parallel with fulcra 9 and 10, to slide 15. The latter is adapted to slide in the longitudinal direction of plate 4 and is guided, during this movement, by engagement of its lower extension 16 with a longitudinal groove 17 located in surface 5 of plate 4.

Connected to slide 15 is rod 18 of piston 19 of a double-acting hydraulic jack bearing the reference numeral 20. Cylinder 21 thereof is carried by a cylindrical block 22 which is perpendicular to plate 4 and is secured to the rear edge thereof opposite the respective front edge 11. This block 22 thus also forms a part of the load-bearing structure of the grip and serves to support the rear part, comprising handle 2, of the respective fairing 1.

Piston 19 divides the interior of cylinder 21 into two chambers 23 and 24 which may be isolated from the outside or may be connected, by means of lines 25 and 26, respectively, to a source 27 of pressurized liquid (see FIG. 11) or to outlet 28 through distributor 29, the function of which will be described hereinafter in greater detail.

The free end-sections of jaws 6 and 7, which project beyond front edge 11 of plate 4, comprise parts 30 extending beyond lower surface 31 of plate 4 opposite upper surface 5 to which the jaws are fitted.

Located in the opposing surfaces of parts 30 are seats 32 which are curved towards median plane 8 near the free ends of the jaws. These seats 32 are designed to hold opposing curved parts 33 of "C" clips 34 (see FIGS. 4 and 6) which are to be subjected to irreversible clamping (i.e. to change from the shape shown in FIGS. 4 to 6 to that shown in FIG. 7).

Each of seats 32 communicates with one of guide-grooves 35 (see FIG. 8) of "C"-shaped cross-section facing each other and located in longitudinal ribs 36 projecting from the opposite edges of surfaces 31 of plate 4 facing surface 5 to which jaws 6 and 7 are fitted.

As a result of this design, seats 32, located on parts 30 of the free end-sections of the jaws, constitute, when the jaws are fully spread apart in the normal manner, extensions of the above-mentioned "C"-shaped guides 35.

Mounted slidingly in the latter, the bottoms of which are spaced apart by an amount substantially equal to the height of clips 34, are the longitudinal edges of a thrust-plate 37. The end of this plate facing parts 30 of the jaws, terminates in a concave frontal edge 38, the curvature of which corresponds approximately to that of the back of clips 34.

Thrust-plate 37 is connected to rod 40 of piston 41 which runs in cylinder 42 of an auxiliary double-acting hydraulic jack bearing the reference numeral 43 and also secured to block 22 below cylinder 21 of jack 20.

Chambers 44 and 45, into which piston 41 divides the interior of cylinder 42, may communicate through lines 46,47 with distributor 48. The latter may also isolate the chamber 44,45 from the outside or may connect them to source 27 of pressurized liquids (e.g. a pump) or to outlet 28, as in the case of distributor 29 and chambers 23 and 24 in cylinder 21. Both distributors 29,48 are controlled by a logic circuit 49 (see FIG. 11). The circuit in question is actuated by closing switch 50 controlled by trigger 51 mounted in rear handle 2, provided that the pressure of the liquid arriving from source 27 (preferably an electric pump) reaches it normal operating value and that the relevant pressure-switch (not shown) allows circuit 4 to operate.

Figures 2, 12:
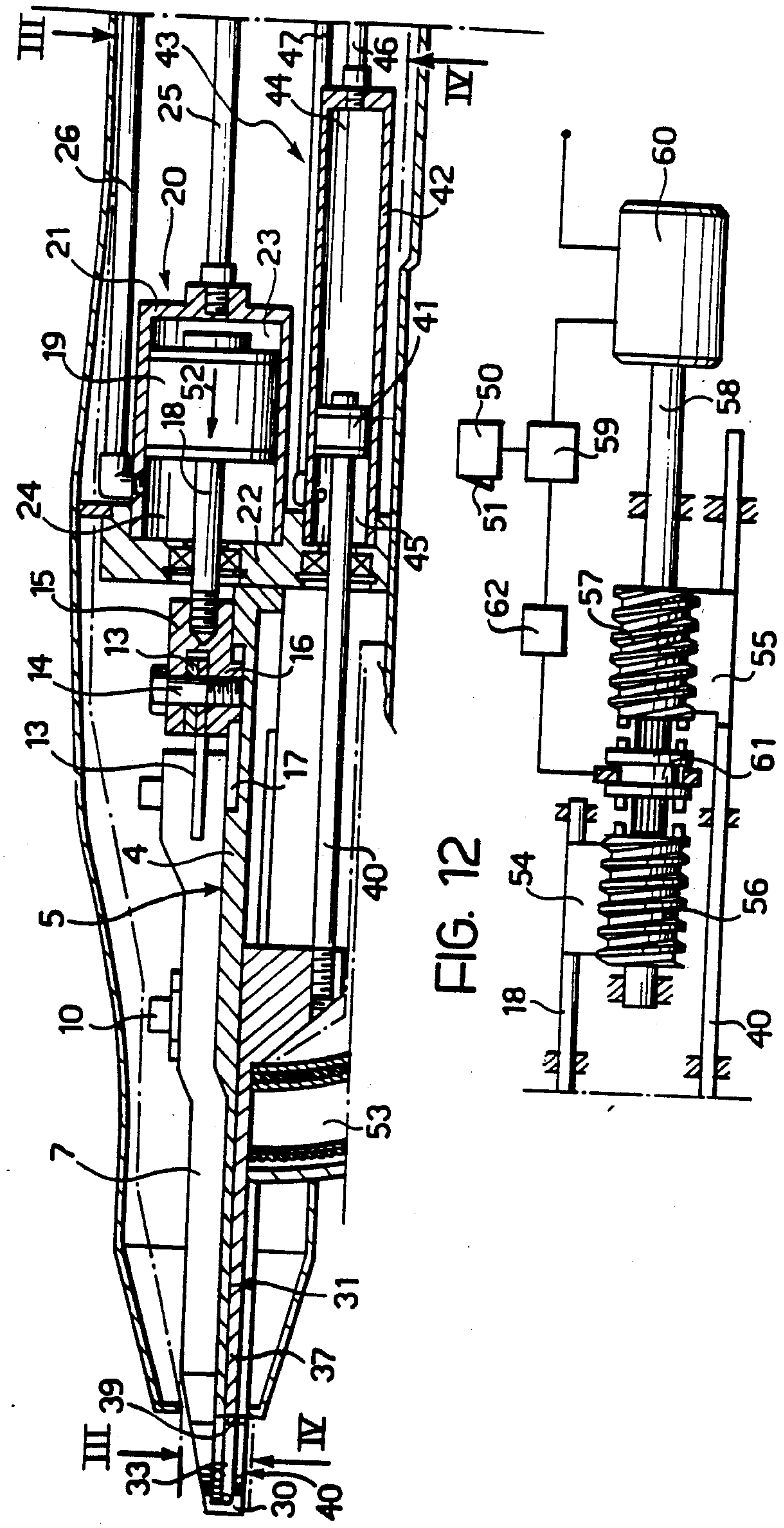
FIG. 2 is a partial view of FIG. 1 in enlarged scale and in part section, in position of rest.
FIG. 12 is a diagrammatical side elevation of a variant of the grip according to the invention.
Figure 6:
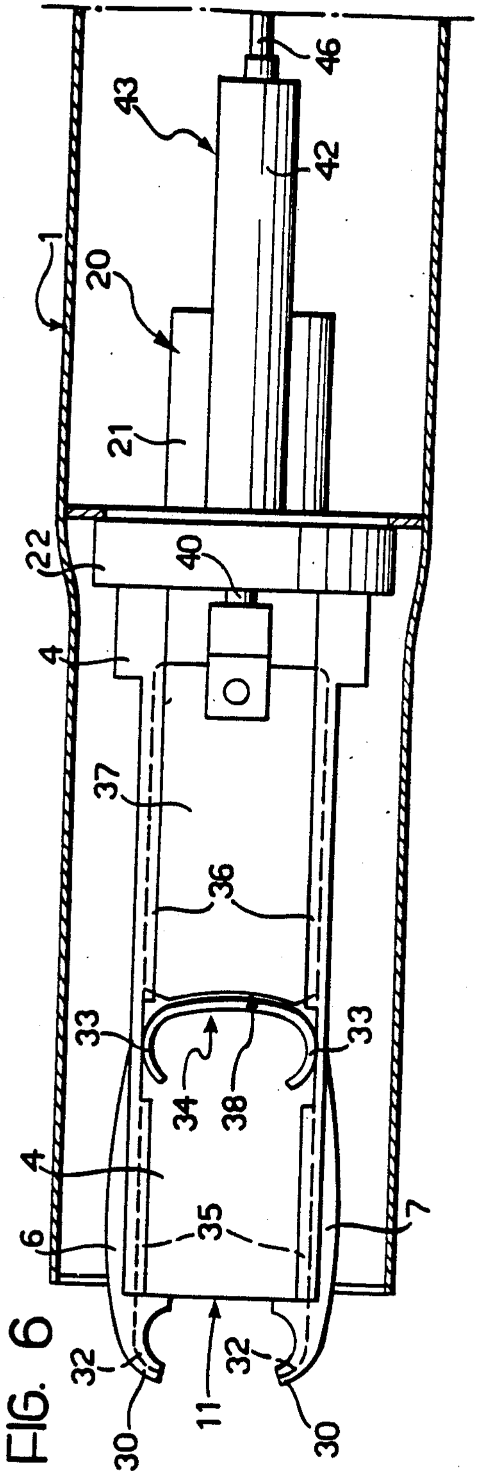
FIG. 6 is a cross-sectional view along the line VI—VI in FIG. 5.
Figure 3:
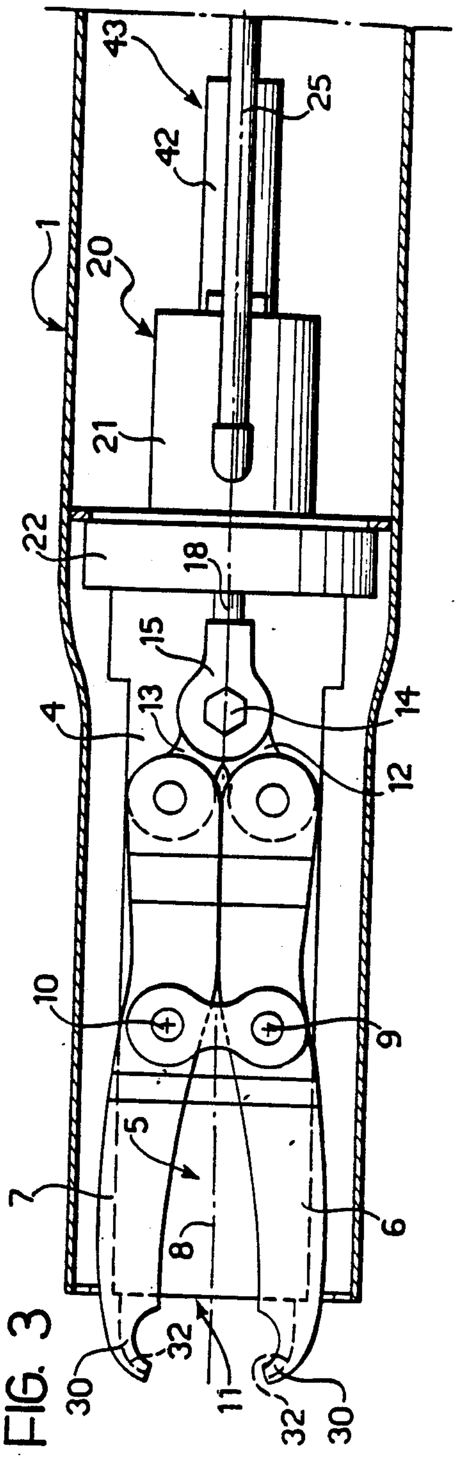
FIGS. 3 and 4 are cross-sectional views along the lines III—III and IV—IV in FIG. 2.
Figure 4:
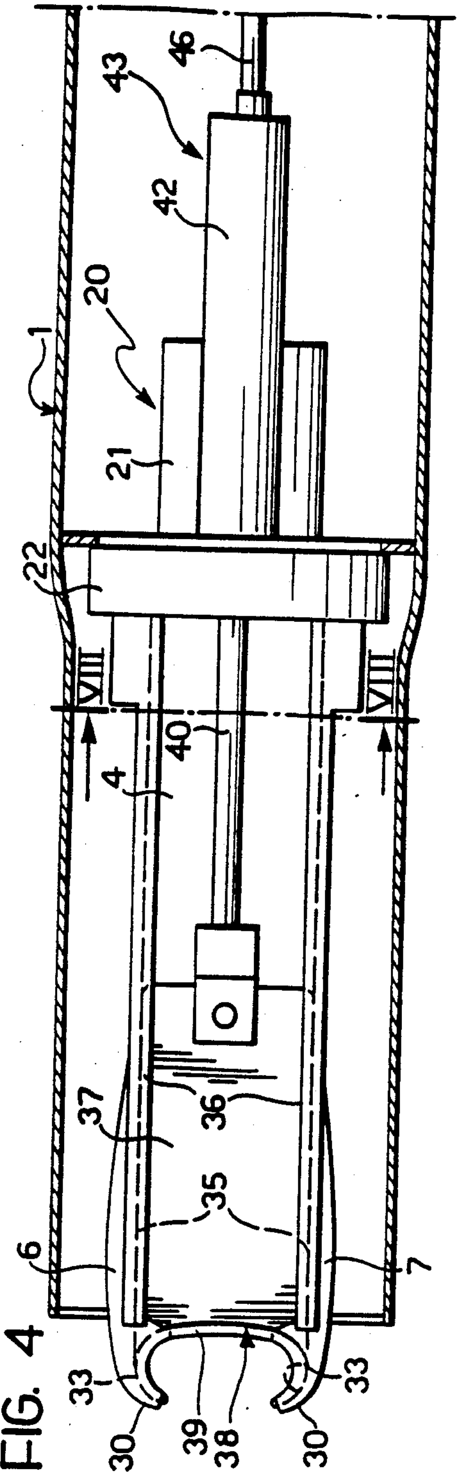

The operating cycle of the foregoing system is as follows:

When the grip is at rest, the parts thereof assume the positions shown in FIGS. 2, 3 and 4. At this time, thrust-plate 37 is in the position of maximal advance towards parts 30 of jaws 6 and 7.

Circuit 49 is activated by depressing trigger or push-bottom 51. This circuit 49 first of all actuates distributor 29 in order to establish a connection between chamber 23 of jack 20 and pump 27, so that piston 19 moves in the direction of arrow 52. On the other hand, piston 41 remains stationary because, at this time, circuit 49 causes distributor 48 to isolate chambers 44 and 45 of jack 43 from the outside.

Figure 7:
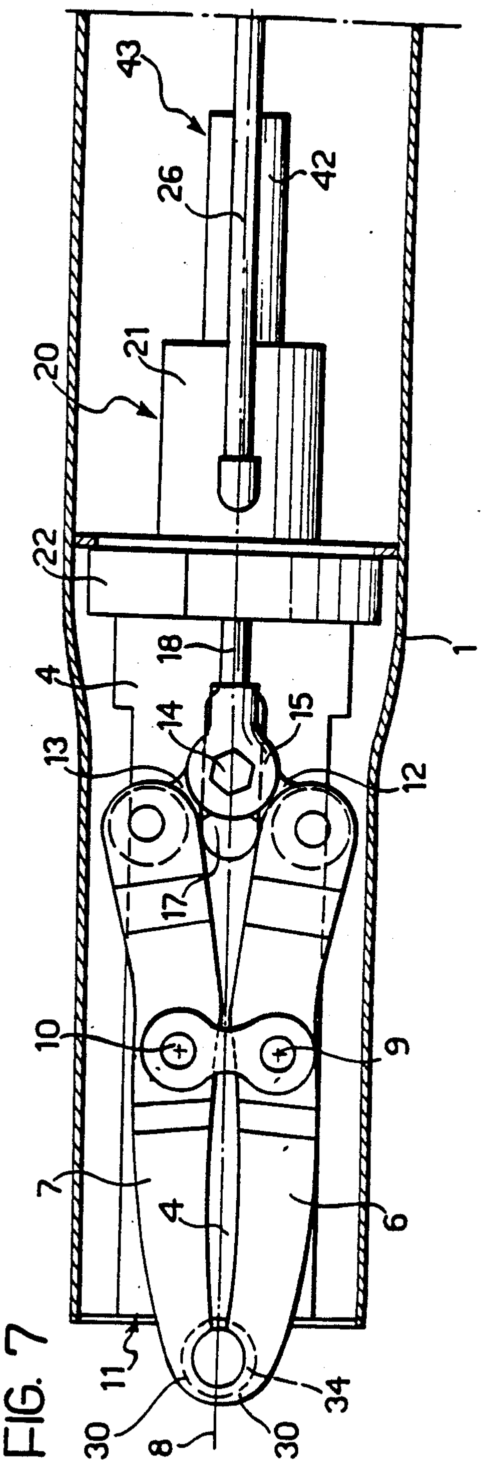
FIG. 7 is a cross-sectional view similar to that in FIG. 3 with the jaws shown in the clamping position.
Figure 5:
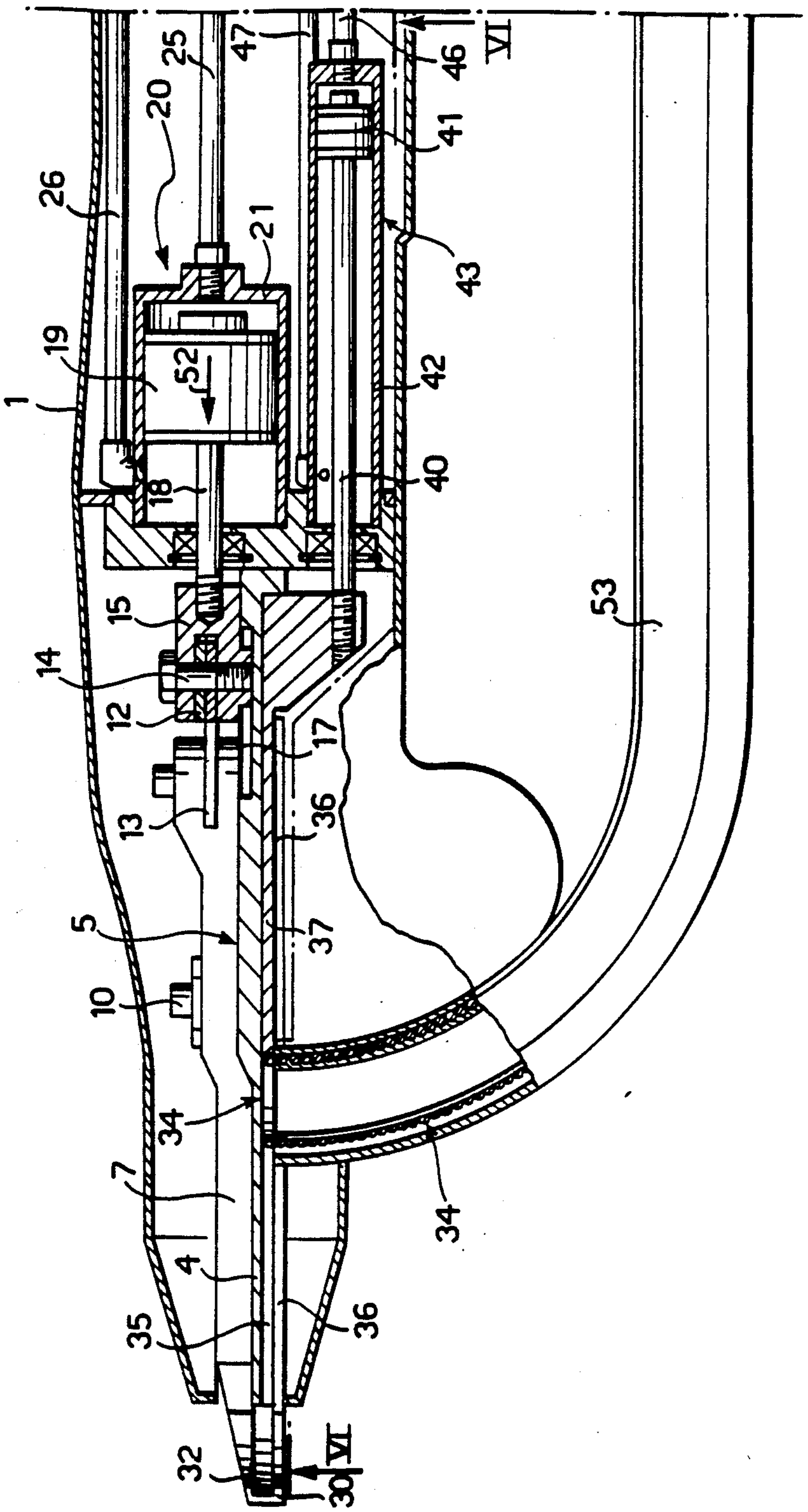
FIG. 5 is a view similar to that shown in FIG. 2, at an enlarged scale and in part section, but with the internal elements in another operative position.
Figure 11:
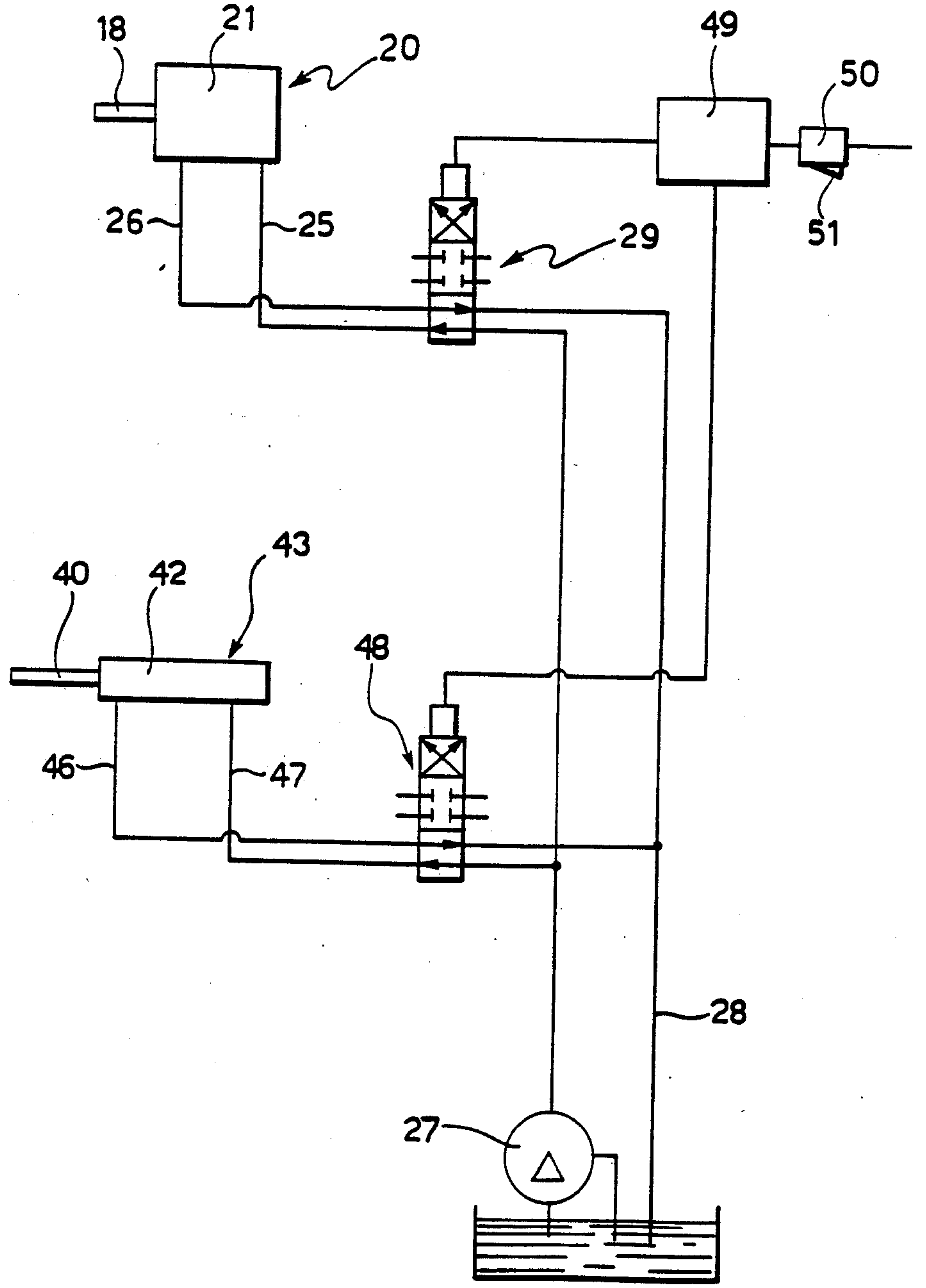
FIG. 11 is a diagram of the electro-hydraulic system which controls the actuation of the grip according to the invention shown in FIGS. 1 to 10.

When piston 19 reaches the end of its stroke and parts 30 of the free end-sections of jaws 6 and 7 have come together, clip 34, previously inserted into seats 32, assume the configuration shown in FIG. 7. Circuit 49 is prearranged so that, at this time, switch 50 is opened when the pressure on trigger 51 is released. Simultaneous actuation of distributor 29 permits withdrawal of piston 19 and allows the free-end sections of the jaws to spread apart.

The next operating phase consists in withdrawal of thrust-plate 37. Auxiliary jack 43 is actuated by logic circuit 49 of distributor 48 in such a manner as to connect chamber 45 of the auxiliary jack to pump 27 and chamber 44 to outlet 28. At the end of the movement of plate 37, concave edge 38 thereof assumes a position immediately upstream of the outlet from magazine 53, in the space between the bottoms of opposing "C"-shaped guides 35 located in ribs 36 of supporting plate 4. This makes it possible for the next clip to emerge from the magazine (under the action of a spring, not shown) and to move, with relevant back 39, to a position adjacent said concave edge 38 of plate 37 (see FIG. 6). Now, while piston 19 is held stationary, since chambers 23 and 24 are isolated from the outside by distributor 29, in the terminal position corresponding to maximal opening of jaws 6 and 7, distributor 48 is changed over by the action of circuit 49 to allow piston 41 to move towards parts 30 of jaws 6 and 7. This movement ceases when piston 41, and with it plate 37, reach the position of maximal advance shown in FIGS. 2 to 4. This cessation is due to the fact that distributor 48 is again changed over in order to isolate from the outside chambers 44 and 45 located on opposite sides of piston 41. This function is imposed under distributor 4 when the pressure-switch (not shown) indicates to circuit 49 that there has been a change in pressure in chamber 44 of cylinder 42 as a result of piston 41 reaching the position of maximal advance towards cylindrical block 22.

At this time, the elements of the grip have again reached the position of rest in which another clip is inserted into seats 32 in parts 30 of the free end-sections of the jaws whence a new operate cycle of the grip may be initiated by depressing push-button 51.

The grip, according to one embodiment of the invention described hereinbefore, assures irreversible clamping even of very heavy clips. It is light and compact due to the adoption of hydraulic control-jacks capable of providing a substantial thrust. In addition to meeting the basic requirements of portable implements, this grip is highly reliable due to the simplification of stop-means preventing withdrawal of the backs of the clips and irregular deformation thereof during clamping.

Although the principle of the invention is naturally fixed, the details thereof may vary widely from what has been described and illustrated hereinbefore purely by way of example, without departing from the scope of the invention as defined in the claims attached hereto.

Thus, for example, for the purpose of controlling the rotation of jaws 6 and 7 and the alternate movements of thrustplate 37, the system shown in FIG. 12 may be used.

In this case, rods 18 and 40, in addition to constituting the piston rods of the double-acting hydraulic jacks as in the method of operation described in connection with FIGS. 1 to 11, comprise racks 54 and 55. Engaging with these racks 54 and 55 are pinions 56 and 57 which are arranged to rotate upon, but not to move axially along, shaft 58. The latter may be actuated, possibly through a clutch controlled by logic circuit 59, by a reversible direct-current motor 60.

Arranged between pinions 56 and 57 is a sleeve with frontal teeth 61 connected to shaft 58 by a grooved coupling and adapted to move along shaft 58 under the action of an electromagnetic control element 62 in response to pulses transmitted by circuit 59 which also controls the operation of motor 60. The control-element may be actuated in such a manner as to cause sleeve 61 to assume three positions: one in which it connects pinion 56 to shaft 58, another in which pinion 57 is connected to shaft 58, and a third in which the rotation of shaft 58 is not transmitted to either pinion and rods 18 and 40 are secured against axial displacement because of the irreversible nature of the rack-and-pinion kinematics.

The method of operation of the grip according to the invention, described in connection with FIGS. 1 to 11, may also be modified as shown in FIGS. 13 to 16.

Figure 14:
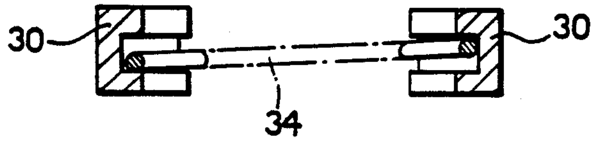
FIGS. 14 and 15 are cross-sections along the lines XIV—XIV and XV-XV in FIG. 13, at a slightly enlarged scale.
Figure 15:
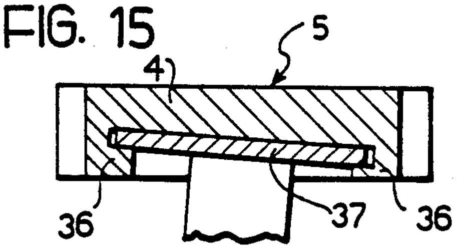
Figure 16:
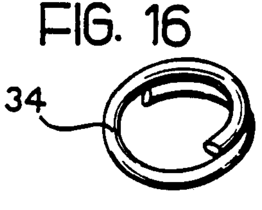
FIG. 16 is a perspective view showing the clip deformed by bringing together the free ends of the jaws.

In this case, guide grooves 35, located in lower longitudinal ribs 36 in supporting plate 4, are arranged in such a manner as to ensure that lower surface 31 of the said supporting plate, and with it thrust-plate 37, are inclined in relation to upper surface 5 of plate 4 upon which jaws 6 and 7 rest. The inclination is selected to ensure that clip 34, inserted into seats 32 in jaws 6 and 7, arranges itself, at the end of the forward movement of plate 37, between the seats, the height of which exceeds the diameter of the clip 54, as shown in FIG. 14. This arrangement facilitates proper clamping of the clip which, as soon as parts 30 of jaws 6 and 7 have come together, assumes the overlapping configuration shown in FIG. 16.

Figure 13:
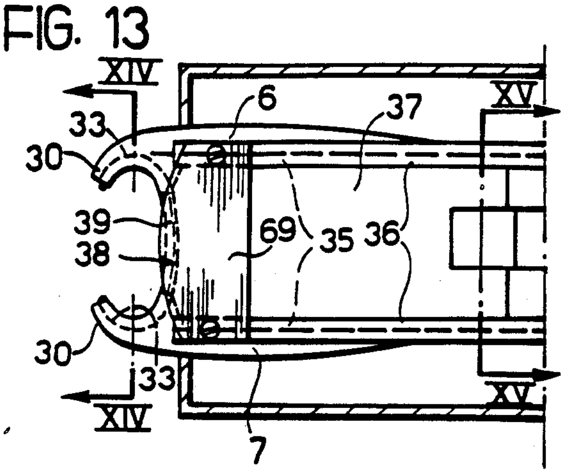
FIG. 13 is a partial cross-section, similar to that in FIG. 4, but covering another embodiment of the grip according to the invention.

During the clamping process, the clip 34 is prevented from moving downwardly by plate 6 secured to the sides of the front end-part of lower surface 31 of plate 4 (see FIG. 13). An arrangement of this kind may also be applied to the structure illustrated in FIGS. 1 to 11.

Figure 17:
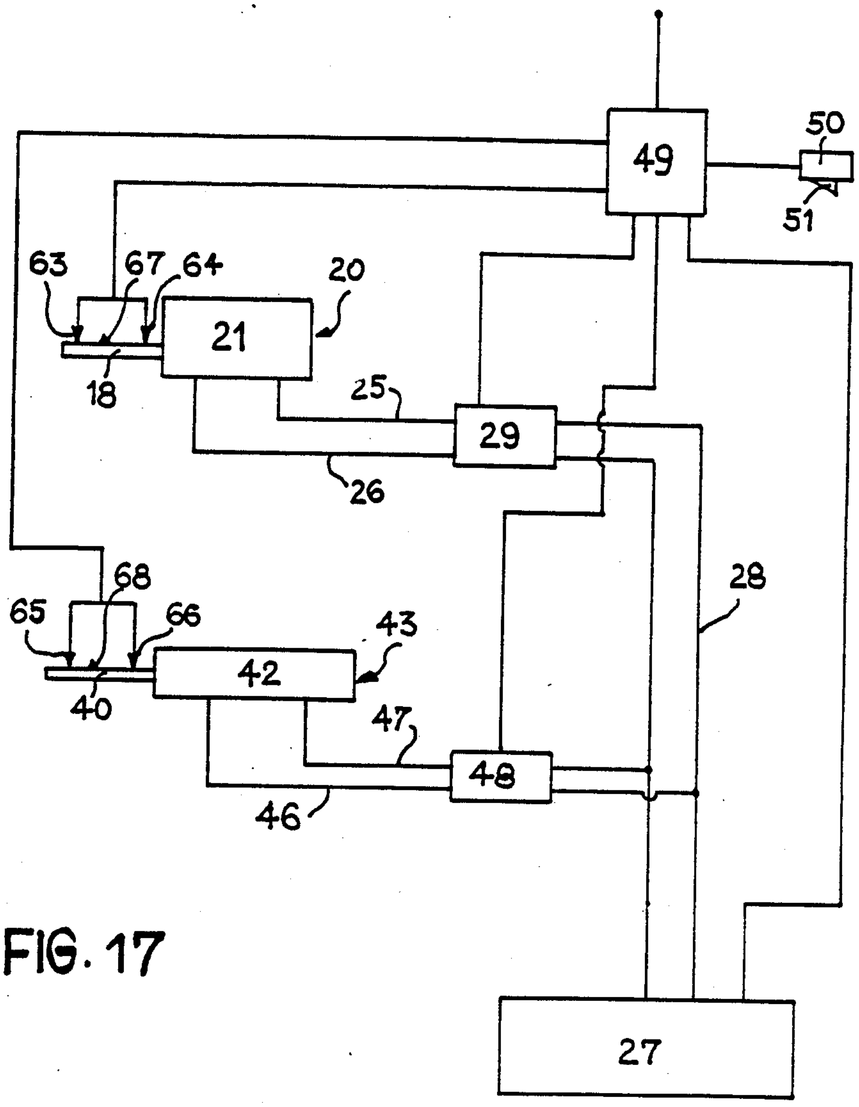
FIG. 17 shows another embodiment of the electro-hydraulic system controlling the embodiment of the grip according to the invention shown in FIGS. 1 to 10 and 13 to 16.

According to another embodiment, the operation of logic circuit 49, which establishes the sequence of operations of the grip according to the invention, is controlled, not only by the pulses transmitted thereto by a pressure-switch, but also by pulses produced by the opening and closing of terminal microswitches 63,64,65,66 located in the vicinity of piston-rods 18,40 and actuated by prongs 67,68 carried on the rods 18,40 (see FIG. 17).

An arrangement of this kind makes the grip more economical to use, increases its operating accuracy, and promotes operator safety.

Electric pump 27, distributors 29 and 48, and the parts of the electric circuit which control the operation of jacks 20 and 43, including logic circuit 49, may be in the form of a compact group possibly arranged in a knapsack or the like adapted to be carried by the person operating the grip.

As result of the reduction in the weight of the grip due to the use of pressurized liquid instead of compressed air to operate the grip, the elements in the above-mentioned group may be mounted directly upon the structure carrying the elements of the grip.

In both cases, the only connection to a source of outside power in an electric cable, which contributes greatly to the operator's mobility and convenience.

It will be noted that the configuration of jaws 6 and 7 may be such that they may be conveniently mounted to rotate about a single bolt projecting from upper surface 5 of supporting plate 4, or about separate bolts 9 and 10.

Finally it will be noted that control of electric motor 60 of the circuit according to FIG. 12 (or of each of two possible motors (not shown) intended to control the movements of rods 18 and 40) may be entrusted to systems similar to that illustrated in FIG. 17.

What is claimed is:

1. A portable grip for the irreversible clamping of "C" clips having curved opposing parts, an open front side and a back side, said grip comprising:
- a supporting structure comprising an elongated supporting plate (4) extending in longitudinal direction along a first plane;
- a pair of jaws (6, 7) having a free end section (30) and being identical in mirror image, pivotally mounted at intermediate points along the length thereof to said supporting plate, said jaws being arranged symmetrically in relation to a plane (8) extending parallel with said longitudinal direction and intersecting said first plane at a right angle;
- a semi-circular seat (32) located in each of said free end sections (30) of said jaws (6, 7) for holding said curved opposing parts (33) of said "C" clips;
- a pair of guide grooves (35) on said supporting plate (4) extending longitudinally along the outer edges thereof, said guide grooves being fixed relative to one another and spaced to guide a "C" clip along said supporting plate;
- a thrust plate (37) slidably movable within said guide grooves (35) for reciprocating movement therein whereby, when said thrust plate is moving toward said free end sections (30) of said jaws, said "C" clip is moved along said guide grooves and transferrred toward said seats (32) so that the open side of said clip is pointing from said grooves to said end sections of said jaws and said back of said clip (39) is abutting said thrust plate;
- a rod connected to said thrust plate for carrying out said reciprocating longitudinal movement within said guide grooves; and
- said free end sections (30) of said jaws (6, 7) protruding beyond said supporting structure in said first plane and extending perpendicularly thereto so that said seats (32) located therein from an extension of said guide grooves (35) for receiving said clip.

2. The grip according to claim 1, additionally comprising a rod mounted to said supporting plate for reciprocating movement and connected to said jaws for imparting a reciprocating movement to said jaws.

3. The grip according to claim 1, further comprising a magazine containing a plurality of said clips; means for transporting said clips from said magazine to a location in front of said thrust plate; and said thrust plate having a thickness substantially equal to the height of said clips.

4. The grip according to claim 2, wherein either the rod causing reciprocating movement of the jaws or the rod integral with the thrust-plate is the rod of the piston of a double-acting jack.

5. The grip according to claim 4, wherein said jack is a hydraulic jack.

6. The grip according to claim 3, wherein the edge of the free end of the movable thrust-plate facing the parts of the free end-sections of the jaws in which the sats are located is provided, at least in its central part, with a concave profile, the curvature of said profile corresponding substantially to that of the back of the clip.

7. The grip according to claim 4, additionally comprising a block (22) connected to said supporting structure and wherein the jacks, which control the movement of the movable thrust-plate and the movement of the jaws, are carried by said block perpendicular to the supporting structure and integral therewith, the rod of said jack thrust-plate and, the rod for moving said jaws being pivotally connected to a slide connected by a connecting rod to the ends of the jaws opposite the ends in which the seats for opposing curved parts of the clips are located.

8. The grip according to claim 2, wherein the reciprocating movements of each rod is produced by a reversible electric motor.

9. The grip according to claim 8, wherein the alternate movement of the two rods is controlled by a reversible electric motor through a clutch and kinematics which are irreversible.

10. The grip according to claim 9, wherein said irreversible kinematics comprises racks carried on the rods and of pinions for rotating upon, but not to move axially along, the shaft which is actuated by said electric motor.

11. The grip according to claim 10, wherein said grip comprises a sleeve-coupling with front teeth arranged between said pinions for assuming, under the action of an electromagnetic control-element controlled by the logic circuit which also controls the operation of the motor, three positions, including two positions in each of which one of the pinions is connected to the shaft actuated by the motor and a third position in which the shaft no longer causes said pinion to rotate.

12. The grip according to claim 3, wherein the guide-grooves, located in the lower longitudinal ribs of the supporting plate, are arranged so as to ensure that the lower surface of said supporting plate, together with the thrust-plate, is inclined in relation to the upper surface of said supporting plate upon which the jaws rest.

13. The grip according to claim 4, wherein all of the elements controlling the operation of the respective jacks are mounted upon the load-bearing structure of the grip.

* * * * *